United States Patent [19]
Lewis et al.
[11] 3,761,624
[45] Sept. 25, 1973

[54] TIME DIVISION SIGNAL TRANSFER NETWORK

[75] Inventors: Theras Gordon Lewis, Boulder; Patrick Alban Vachon, Arvada, both of Colo.

[73] Assignee: Bell Telephone Laboratories, Incorporated, Berkeley Heights, N.J.

[22] Filed: July 31, 1972

[21] Appl. No.: 276,898

[52] U.S. Cl. ..... 179/15 AA, 179/18 BC, 179/1 CN, 179/15 AT
[51] Int. Cl. .......... H04j 3/02
[58] Field of Search .......... 179/15 AT, 15 AA, 179/18 BC, 1 CN, 15 AQ, 15 A

[56] References Cited

UNITED STATES PATENTS

| | | | |
|---|---|---|---|
| 3,293,369 | 12/1966 | Schroeder | 179/15 AT |
| 3,511,931 | 5/1970 | VanBuren | 179/1 CN |
| 3,319,005 | 5/1967 | Gaunt | 179/18 BC |
| 3,420,959 | 1/1969 | Hall | 179/18 BC |
| 3,551,600 | 12/1970 | Berch | 179/18 BC |
| 3,251,947 | 5/1966 | Schlichte | 179/15 AA |
| 3,617,643 | 11/1971 | Nordquist | 179/15 AQ |

*Primary Examiner*—Kathleen Claffy
*Assistant Examiner*—Thomas D'Amico
*Attorney*—W. L. Keefauver et al.

[57] ABSTRACT

A time division communication system serves a plurality of lines and trunks and includes first and second line buses and first and second trunk buses. Each line has an associated circuit operative in response to a control signal to apply the line signal to the first line bus and to receive a signal from the second line bus. Each trunk has an associated circuit operative in response to said control signal to apply the trunk signal to the first trunk bus and to receive a signal from the second trunk bus. The control signal is applied to selected line and trunk circuits in a distinct time slot. A network interconnecting the buses includes a first device connected to the first line bus for summing all selected line circuit signals, and a second device connected to the first trunk bus for summing all selected trunk signals. The summed trunk signals are added to the summed line circuit signals in a third device which is connected to the second trunk bus. The summed line signals are attenuated and the attenuated summed line signals are added to the summed trunk circuit signals in a fourth device which is connected to the second line bus.

7 Claims, 5 Drawing Figures

TIME DIVISION SIGNAL TRANSFER NETWORK

BACKGROUND OF THE INVENTION

Our invention relates to communication systems and more particularly to information transfer arrangements in a time division communication system.

Time division communication systems permit a plurality of concurrent information exchanges over a common communication link. Each exchange is assigned to a particular time slot of a repetitive group of time slots. During the repetitive time slot group, a plurality of information sample exchanges are sequentially completed over the common link. In one such time slot, the information from each line assigned to the connection in the time slot is sampled and the sample is transferred to the other assigned lines via the common link. The common link is available to other line connections during the remaining time slots of the repetitive time slot cycle. As is well known in the art, the sampling rate for the line connections may be selected to provide an accurate information transfer between selectively interconnected lines. Where the sampling rate is periodic and greater than twice the highest frequency to be transferred, the signal transmission may be without loss.

In some prior art time division communication systems, a resonant transfer between a pair of line associated storage devices is utilized to accomplish the information exchange in a distinct time slot. This type of transfer requires a relatively precise network for the information exchange which network includes the line associated storage capacitors and inductive elements specially selected for precisely timed signal transfers. Since the energy exchanged in each time slot is limited to a small time sample of the signal, a relatively large amount of power is needed for each exchange and only a small portion of the energy transferred by means of resonant transfer lies within the desired frequency range. Thus, the electronic switches interconnecting the selected lines in a time slot must have very low losses and must be precisely timed. Additionally, the conversion of the exchanged information from sampled form to analog signals requires a complex filter associated with each line storage device to provide maximum transfer of the limited energy available in the desired band.

In other time division signal transfer systems, a sample signal from a storage device is transferred directly to a second storage device wherefrom the stored sample is made available for an extended period of time. This sample and hold switching arrangement provides a larger signal component in the desired band so that the filter requirements are simplified and, further, inductive elements are eliminated in the transfer network. But, the sample and hold technique has generally required at least two successive time intervals to complete the signal transfer between a pair of lines. Other forms of sample and hold time division transfer systems such as illustrated in the copending application Ser. No. 224,780, filed Feb. 9, 1972 and assigned same assignee provides a signal transfer between a pair of lines on a time division basis in a single time interval. These arrangements, however, require the use of three or more time division buses and are limited to signal transfers between a pair of lines in each time slot.

One type of time division communication system which permits information exchange among an unrestricted number of communication paths in a single time interval is illustrated in the copending application Ser. No. 276,897 of T. G. Lewis et al., filed July 31, 1972. In that system, the outgoing signals from a plurality of communication paths are coupled to a first time division bus during a selected time slot. The coupled outgoing signals are summed and applied to a second time division bus in the selected time slot. A time division hybrid circuit is connected between each communication path and the pair of time division buses wherein the outgoing signal from each communication path is subtracted from the incoming sum signal obtained from the second time division bus, and the resulting difference signal is applied to the communication path in the selected time slot. Where the attenuation in each communication path is the same, the outgoing signals may be summed in a common coupling circuit connected between the two time division buses and distributed to the selected hybrid circuits via the second common bus. If, however, the communication paths are of varying types, the signal attenuation may differ for each type path whereby undesirable differences in signal levels received by a communication path may occur. For example, a plurality of lines and trunks may be connected through a time division communication system. The signals from the lines are substantially larger than the signals from the trunks whereby trunk signals applied to a line via the communication system are substantially smaller than line signals applied thereto. The result is an undesirable contrast in signal levels received by a line. This difference in signal levels is dependent on the sources of the received signals.

BRIEF SUMMARY OF THE INVENTION

Our invention is a time division communication system that serves a plurality of lines and a plurality of trunks and includes incoming and outgoing time division line buses and incoming and outgoing time division trunk buses. Each line has an associated circuit operative in response to a control signal to apply the associated line signal to the outgoing line bus and to receive a signal from the incoming line bus. Each trunk has an associated circuit operative in response to said control signal to apply the associated trunk signal to the outgoing trunk bus and to receive a signal from the incoming trunk bus. The control signal is applied to selected line and trunk circuits in a distinct time slot and a network is connected to the incoming and outgoing line buses and the incoming and outgoing trunk buses to exchange signals among the selected lines and trunks in the distinct time slot. The network includes a first summing device connected to the outgoing line bus which sums the outgoing signals from the selected lines and a second summing device connected to the outgoing trunk bus which sums the outgoing signals from the selected trunks. The summed outgoing line signals from the first device are passed through an attenuator and are applied therefrom to a third summing device together with the summed outgoing trunk signals from the second summing device. The resulting sum signal from the third device is applied to the incoming line bus. A fourth summing device receives the summed outgoing line signals and the summed outgoing trunk signals and applies the resulting sum signal to the incoming trunk bus. Since the selected outgoing trunk signals are substantially smaller than the selected outgoing line signals, the network advantageously equalizes the trunk and line signals applied to the incoming line bus.

According to one aspect of the invention, each summing device comprises an operational amplifier adapted to couple the outgoing coupled line signals from the outgoing line bus. A resistive attenuator circuit is connected from the output of the first summing amplifier to the input of the third summing amplifier whereby the signal level of the sum of the outgoing line signals is adjusted to have an appropriate relationship to the sum of the outgoing trunk signals applied to the third summing amplifier. The outputs of the first summing amplifier and the second summing amplifier are directly coupled to the fourth summing amplifier.

DETAILED DESCRIPTION

Figure 1:
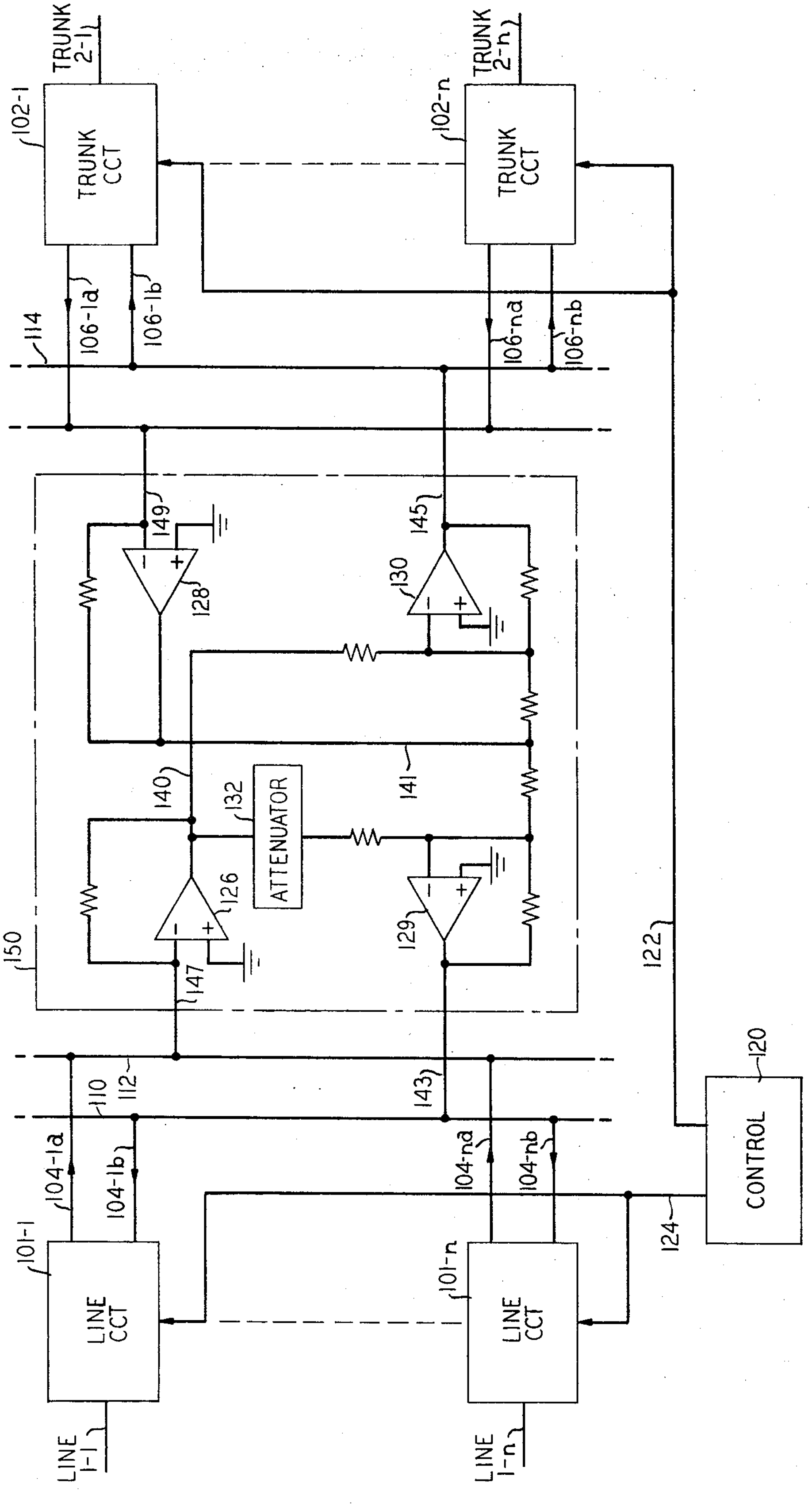
FIG. 1 depicts a time division communication arrangement illustrative of our invention.

FIG. 1 shows a time division communication system illustrative of our invention that services a plurality of lines and a plurality of trunks. FIG. 1 includes line circuits 101-1 through **101-*n* which are connected to lines 1-1 through 1-*n* respectively, outgoing line time division bus 112 and incoming line time division bus 110. Each line circuit is connected to bus 112 and is also connected to bus 110. Trunk circuits 102-1 through 102-*n* are connected to trunks 2-1 through 2-*n*, respectively, and each trunk circuit is also connected to outgoing trunk time division bus 116 and incoming trunk time division bus 114. Buses 110, 112, 114 and 116 are also connected to coupling circuit 150 which is operative to transfer signals from the outgoing line and trunk buses to the incoming line and trunk buses. Control 120 is connected to each of line circuits 101-1 through 101-*n* via cable 124 and is further connected to trunk circuits 102-1 through 102-*n* via cable 122. Control 120** is operative to provide control signals to each line and trunk circuit whereby selected line and trunk circuits are rendered active in selected time slots to provide signal exchanges between the selected line and trunk circuits.

Figure 3:
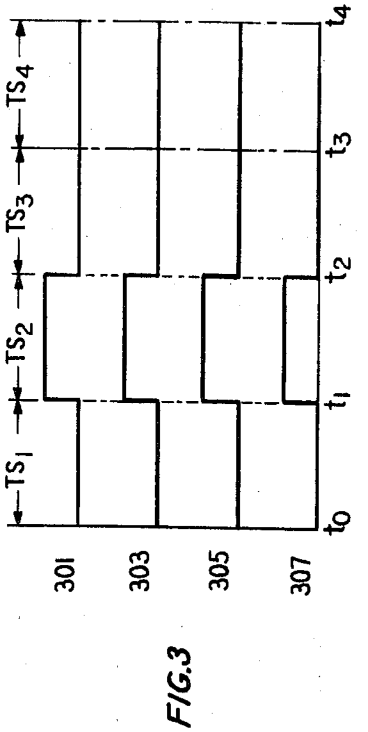
FIG. 3 shows waveforms useful in describing the control of the time division communication arrangements of FIG. 1.

Assume for purposes of description that line circuits 101-1 and **101-*n* and trunk circuits 102-1 and 102-*n* are interconnected in time slot ts2 of each respective time slot cycle to provide a conference call connection. A code corresponding to the call connection is stored in control 120 and control signals are applied via cable 124 to line circuits 101-1 and 101-*n* in each repetitive cycle. The control signal applied to line circuit 101-1 is illustrated in waveform 301 of FIG. 3 and the control signal applied to line circuit 101-*n* is illustrated in waveform 303. A control signal is also applied via cable 122 to trunk circuit 102-1 as shown in waveform 305 and a control signal is further applied to trunk circuit 102-*n* via cable 122 as illustrated in waveform 307**.

In time slot $ts2$, the outgoing signal from line 1-1 is sampled by line circuit 101-1 and this signal $e$1-1 is applied via lead **104-1*a* to bus 112. Similarly, the outgoing signal from line 1-*n* is sampled by line circuit 101-*n* and the sample signal $e$1-*n* is applied to outgoing bus 112 via lead 104-*na*. The outgoing trunk signal from trunk 2-1 is sampled by trunk circuit 102-1 and this sample signal $e$2-1 is applied to bus 116 via lead 106-1*a*. The outgoing signal from trunk 2-*n* is sampled by trunk circuit 102-n and the sampled outgoing signal $e$2-*n* is applied to bus 116 via lead 106-*na*. line signal appearing on bus 112 in time slot $ts2$ is $e1\text{-}1 + e1\text{-}n$ and the signal appearing on bus 116 is $e2\text{-}1 + e2\text{-}n$. Since trunks 2-1 and 2-*n* represent relatively long communication paths that include at least one terminated line, the signals $e$2-1 and $e$2-*n* applied to bus 116 are generally much smaller than the signals applied to bus 112 from the selected line circuits. This is so because the connected lines are relatively short compared to the connected trunks. Coupling circuit 150 receives the signals from buses 112 and 116 and transmits the sum of the received signals to the connected line and trunk circuits via buses 110 and 114. If coupling circuit 150 included only a single amplifying circuit, the signals transferred to the line circuits that originated from lines would be substantially larger than the signals originating from trunk circuits and the contrast in the received signals would be undesirable for line subscribers. The arrangements of circuit 150** advantageously include a plurality of amplifying devices combined to eliminate the contrast between lines and trunk signals without the use of additional switching equipment.

Coupling circuit 150 includes operational amplifiers 126, 128, 129 and 130. These operational amplifiers are well known in the art and each amplifier is adjusted to provide unity gain with inversion. Amplifier 126 receives the signal $e1\text{-}1 + e1\text{-}n$ from bus 112 via lead 147 in time slot $ts2$. The output of amplifier 126 appears on lead 140 and is transmitted to amplifier 130 without attenuation and is also transmitted to amplifier 129 via attenuator 132. The signals appearing on bus 116 are applied via lead 149 to amplifier 128 so that the output signal on lead 141 is $-(e2\text{-}1 + e2\text{-}n)$. Because of the attenuation in attenuator 132 the input to amplifier 129 from attenuator 132 is $-k(e1\text{-}1 + e1\text{-}n)$ where $k$ represents the attenuation ratio of attenuator 132. The output of amplifier 129 is then $k\,(e1\text{-}1 + e1\text{-}n) + e2\text{-}1 + e2\text{-}n$. The factor $k$ is adjusted so that the sum of the station signals and the sum of the trunk signals appearing on lead 143 are equalized. The equalized sum is then applied to line circuits 101-1 and **101-*n* in time slot $ts2$ via line bus 110 and leads 104-1*b* and 104-*nb***.

The output signals on lead 140 and lead 141 are applied to amplifier 130 so that the sum of the trunk and line signals appear on lead 145 and are transmitted therefrom via bus 114 and leads **106-1*b* and 106-*nb* to trunk circuits 102-1 and 102-*n*. Since there is no requirement for equalization of trunk and line signals applied to trunks no attenuation is required in the path between outgoing buses 112 and 116 and incoming bus 114. Line circuits 101-1 and 101-*n* receive the equalized sum signals, subtract the outgoing signal from the outgoing signal line from the equalized sum signals and transfer the resultant signals which are substantially the signals from the other trunks and lines to the connected line. Similarly trunk circuits 102-1 and 102-*n* are operative to receive the sum signal from bus 114**, subtract the connected trunk signal from the sum signal, and transfer the resulting difference to to the connected trunk.

Figure 2:
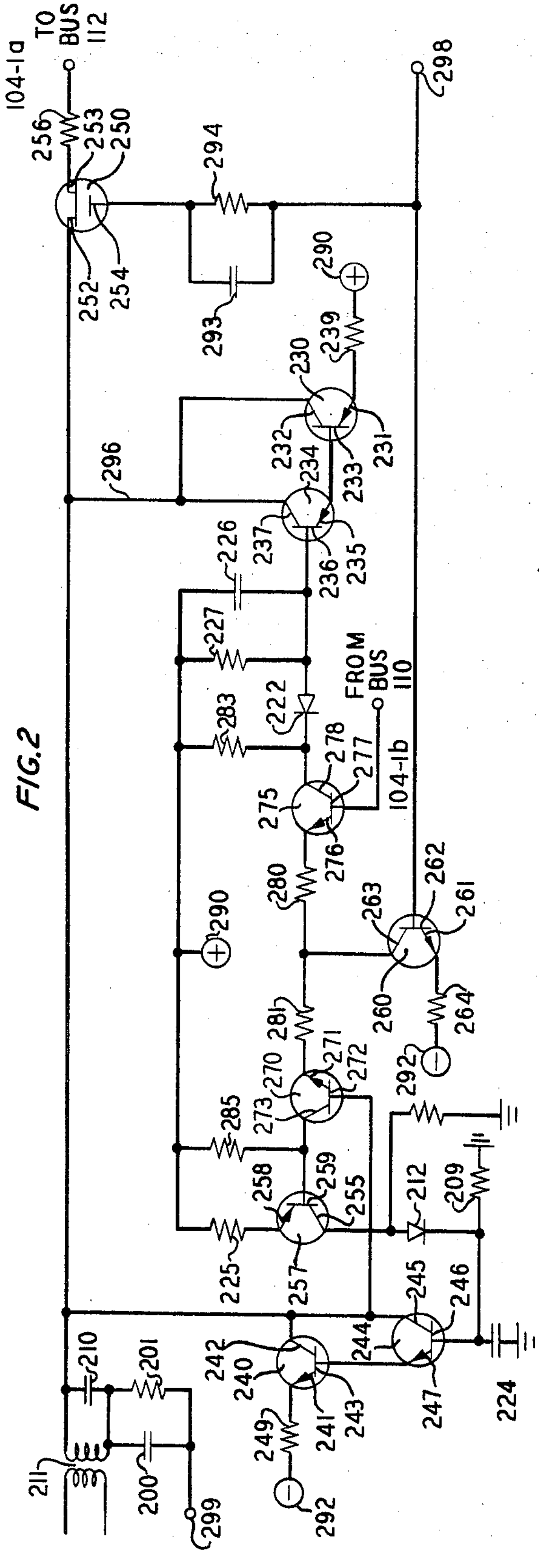
FIG. 2 depicts a time division circuit that may be used in the time division communication arrangements of FIG. 1.

FIG. 2 shows a circuit diagram of the signal transfer arrangement such as disclosed in the copending application Ser. No. 276,897, filed July 31, 1972 which may be used in each line and trunk circuit of FIG. 1. The circuit of FIG. 2 may, for example, be the signal transfer arrangement in line circuit 101-1. Referring to FIG. 2, transistors 270, 275 and 260 are npn transistors well known in the art, and the amplifier circuit including these transistors is a differential amplifier also well known in the art. Collector 273 of transistor 270 is connected to positive voltage source 290 via resistor 285. Emitter 271 is connected to collector 263 via resistor 281 and emitter 261 is connected to negative source 292 via resistor 264. Similarly, collector 275 is connected to positive voltage source 290 via resistor 283 and emitter 276 is connected to collector 263 via resistor 280. During the selected time slot *ts*2, a positive signal is applied from control 120 to base electrode 262 of transistor 260 via lead 298 whereby transistor 260 is rendered conductive. In this way, transistors 270 and 275 are biased in their linear range of operation and transistor 260 operates as a current source to provide a high impedance path from the junction between resistors 280 and 281 and negative source 292. In this manner, the amplifier arrangement including transistors 270 and 275 is rendered operative as a differential amplifier. The values of the resistors associated with these transistors are selected so that the amplifier has a gain of 2. It is to be understood that other resistor values may be selected and that the circuit may be used with gain other than that of 2.

In the selected time slot *ts*2, the d.c. voltage at collector 278 is such that diode 222 is rendered conductive and the d.c. voltage at collector 273 is such that *pnp* transistor 257 and diode 212 are conductive. Thus the output voltage from collector 278 is applied to capacitor 226 via conducting diode 222 and the output from collector 273 is applied to capacitor 224 via conducting transistor 257 and conducting diode 212.

During the distinct time slot, signal *e*1-1 from line 1-1 is applied to capacitor 210 via transformer 211 and is stored therein. The positive signal on lead 298 is applied via the pulse shaping network including resistor 294 and capacitor 293 to gate 254 of IGFET device 250. This positive signal turns IGFET 50 on whereby there is a conductive bidirectional path between drain electrode 253 and source electrode 252. The signal *e*1-1 on capacitor 210 is transmitted to bus 112 via conducting IGFET device 250, coupling impedance 256 and lead 104-1*a*. Since line circuits 101-*n*, and trunk circuits 102-1 and 102-*n* are also enabled during time slot *ts*2, the signals from circuit 101-*n* are applied to bus 112 and the signals from circuits 102-1 and 102-*n* are applied to bus 116. Thus, the output of network 150 on bus 110, FIG. 1, during time slot *ts*2 is $k(e1\text{-}1 + e1\text{-}n) + e2\text{-}1 + e2\text{-}n$ and the signal returned from bus 112 to base 277 of transistor 275 via lead 104-1*b* is $e_s = k/2\ (e1\text{-}1 + e1\text{-}n) + e2\text{-}1/2 + e2\text{-}n/2$. The factor of ½ in the sum signal returned to base 277 occurs because of the impedance matching in the signal transfer network. The output of capacitor 210 is also applied to base 272 of transistor 270 via lead 214. In accordance with the well known principles of differential amplifier operation, the resulting voltage on collector 278 during time slot ts2 is $$V_q - 2\ (es - e1\text{-}1). \quad (1)$$

The voltage on collector 273 is $$V_a + 2\ (es - e1\text{-}1).$$

(2) $V_q$ is the quiescent d.c. operating voltage on each of collectors 273 and 278. As herein-before mentioned there is a conductive path from collector 278 to capacitor 226 via diode 222 whereby the voltage on collector 278 is transmitted to capacitor 226. Similarly, the voltage on collector 273 is transmitted to capacitor 224 via transistor 257 and diode 212.

When time slot ts2 is terminated, the control voltage applied to lead 298 becomes sufficiently negative so that transistor 260 is rendered nonconductive and IGFET device 250 is turned off. No current flows through transistors 270 and 278 because transistor 260 is nonconductive and the voltage on collector 278 becomes substantially that of positive voltage source 290 whereby diode 222 is rendered nonconductive. Similarly, the voltage at collector 273 is substantially that of positive voltage source 290 so that transistor 257 and diode 212 become nonconductive. Capacitor 226 retains the voltage transferred thereto from collector 278 during time slot ts2 and capacitor 224 retains the voltage transferred thereto from collector 273 during time slot ts2.

During the interval between successive occurrences of time slot *ts*2, the voltage on capacitor 226 is applied to base 236 whereby transistors 234 and 233 are rendered conductive. Pnp transistors 234 and 233 are connected as a Darlington pair well known in the art so that the outputs from collectors 232 and 237 are combined and a positive current is applied to capacitor 210. This current is determined by the value of resistor 239 and the voltage on base 236. The gain of the Darlington pair including transistors 234 and 233 is sufficiently high so that substantially no current flows from base 236 into capacitor 226 is the time interval between *ts*2 time slots. Capacitor 226 is discharged through resistor 227. The value of resistor 227 is selected so that this discharge is completed in approximately one-half the aforementioned time interval. The voltage controlling the operation of the positive current source from capacitor 226 is $$[V_a - 2(es - e1\text{-}1)]\ e\ {-t/R_1c_1}. \quad (3)$$

$R_1$ is the value of resistor 227 and $c_1$ is the value of capacitor 226.

In a similar manner, the voltage stored on capacitor 224 is applied to base 246 of transistor 244. Npn transistors 244 and 240 are connected in a Darlington arrangement to obtain high gain and the outputs of collectors 245 and 242 are combined whereby a negative current is applied to capacitor 210. The gain on the Darlington arrangement including transistors 240 and 244 is such that substantially no current flows from base 246 into capacitor 224 in the subject time interval. Capacitor 224 is discharged through resistor 209. The value of resistor 209 is selected so that the discharge of capacitor 226 is completed in approximately one-half the subject time interval. The voltage controlling the operation of the negative current source is the voltage on capacitor 224 and is given by $$[V_q + 2\ (es - e1\text{-}1)]\ e^{-t/R_1c_1}. \quad (4)$$

$R_1$ is the value of resistor 209 and $c_1$ is the value of capacitor 224. The sum of the currents from the positive current source and the negative current source is applied to capacitor 210 via leads 296 and 297. At the end of the last occurring *ts*2 time slot, capacitor 210 has a voltage thereon equal to the signal voltage *e*1-1 transferred thereto. Since the impedance across capacitor 210 from transformer 211 is the properly matched station impedance, the values of resistors 239, 249 and resistors 227 and 209 as well as capacitors 224, 226 and 210 may be advantageously selected so that the average value of the signal voltage across capacitor 210 over the time interval between successive *ts*2 time slots includes a signal corresponding to the sum of the signal voltages from the other stations in the established call connection. This signal is transferred from capacitor 210 to the connected line via transformer 211 during the interval between successive *ts*2 time slots. In this way the outgoing signal from the station connected to capacitor 210 is transferred to bus 112 during the selected time slot *ts*2 and the sum of the signals from the other connected lines and trunks is transferred from capacitor 210 to the connected line in the time interval between successive occurrences of time slot *ts*2.

Figure 4A:
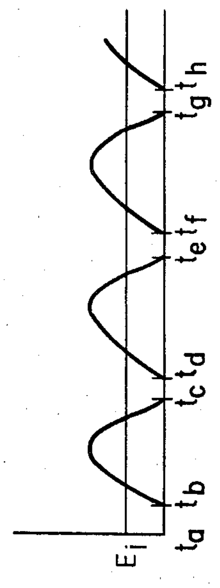
FIGS. 4A and 4B show waveforms useful in describing the operation of the hybrid circuit of FIG. 2.

FIG. 4A shows the voltage waveform across capacitor 210 in FIG. 2 in a call connection where the line connected to the line circuit of FIG. 2 is not producing a signal voltage and signals from other lines and trunk circuits in the connection are sent to the line circuit of FIG. 2 over lead 104-1*b*. The selected time slots for the connection occur between times *ta* and *tb*, *tc* and *td*, *te* and *tf*, and *tg* and *th* in FIG. 4A. Since the output of the connected line is zero, the signal across capacitor 210 during the selected time slots is also zero. This is insured by the selection of the RC time constants in the circuit of FIG. 2. In the selected time slot, for example, between *ta* and *tb*, the signal from lead 104-1*b* is applied to base 277 of transistor 275 and signals corresponding to the incoming signal are stored on capacitors 226 and 224 as hereinbefore described. At time *tb*, capacitors 226 and 224 are disconnected from collectors 278 and 273; the positive current source including transistors 230 and 234 and negative current source including transistors 240 and 244 apply currents to capacitor 210 responsive to the stored incoming signal. The time constants of the circuit of FIG. 2 are arranged such that the signal on capacitor 210 at time *tc* is zero. During the time interval between times *tb* and *tc*, the signal voltage across capacitor 210 is transferred to the connected line via transformer 211. Since transformer 211 is properly terminated by the connected line, the average of the signal voltages shown in FIG. 4A is E1 as indicated in FIG. 4A; and this average volage E1 corresponds to the incoming signal from lead 104-1*b*.

Figure 4B:
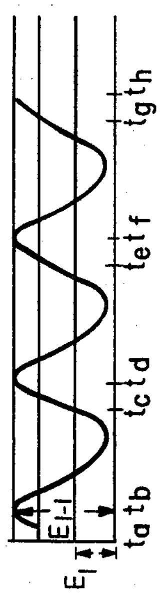

FIG. 4B shows the waveform across capacitor 210 during an established call connection where the line connected to the line circuit of FIG. 2 provides a signal voltage having a peak value of E1-1 and the other participating lines and trunks provide zero signals. At the end of each selected time slot, the voltage across capacitor 210 is E1-1 because of the transfer from the connected station. This is shown at times *tb*, *td*, *tg* and

*th* in FIG. 4B. During each selected time slot, for example between *ta* and *tb*, the signal from the connected line is applied to base 272 of transistor 270 via lead 214, and in accordance with the foregoing description, signal voltages corresponding to the line outgoing signal are stored in capacitors 224 and 226. Between times *tb* and *tc*, the current sources of FIG. 2 are operative so that the signal voltage on capacitor 210 varies as is shown in FIG. 4B. In accordance with the selected time constants of the line circuit of FIG. 2, the average value of the voltage across capacitor 210 is E1 and this signal is transferred from capacitor 210 to the other lines and trunks in the call connection. Where all lines and trunks of the established call connection provide signal voltages, the desired signal exchange occurs for the lines and trunks in the call connection since the waveforms of FIG. 4A and FIG. 4B may be linearly combined by superposition.

What is claimed is:

1. A time division communication system wherein a plurality of time slots occurs in repetitive cycles comprising a first group of communication paths, a second group of communication paths, first, second, third and fourth common buses, a control signal source, each first group communication path having an associated circuit including means responsive to a control signal from said source for applying the associated first group communication path signal to said first common bus and for receiving a signal from said second common bus, each second group communication path having an associated circuit comprising means responsive to said control signal for applying a signal from the associated second group communication path to said third common bus and for receiving a signal from said fourth common bus, and means for exchanging signals among selected first and second group communication paths in a distinct time slot including means for applying said control signal to each selected first and second group communication path circuit in said distinct time slot, and a network connected to said first, second, third and fourth common buses, said network comprising first means connected to said first common bus for summing all selected first group communication path signals appearing on said first common bus, second means connected to said third common bus for summing all selected second group communication path signals appearing on said third common bus, means connected to said first means for controlling the magnitude of the sum of all first group communication path signals from said first means, third means connected to said magnitude controlling means, said second means and said second common bus for summing the output of said magnitude controlling means and the output of said second means and for applying the summed controlling means output and second means output to said second common bus, and fourth means connected to said first means, said second means and said fourth common bus for summing the outputs of said first and second means and for applying the sum of the first means output and the second means output to said fourth common bus.

2. A time division communication system according to claim 1 wherein each of said first, second, third and fourth means comprises amplifying means and said magnitude controlling means comprises means for attenuating the sum of the said first group communication path signals from said first amplifying means.

3. A time division communication system according to claim 2 wherein each of said first, second, third and fourth amplifying means comprises an operational amplifier having unity gain.

4. A time division communication system according to claim 2 wherein each first group communication path comprises a line and each second group communication path comprises a trunk, the outgoing signal from each selected line being greater in magnitude than the outgoing signal from each selected trunk.

5. A time division communication system according to claim 1 wherein each first group communication path circuit applying means and each second group communication path circuit applying and receiving means comprises means for receiving an outgoing signal from said associated communication path, first storing means for storing said outgoing signal, means responsive to said control signal in said distinct time slot for connecting said first storing means to one of said first and third common buses, and each first and second group communication path circuit further comprises means responsive to the signal received from one of said second and fourth common buses, and the outgoing signal from said first storing means for generating a signal corresponding to the difference between the received signal and the stored outgoing signal from said first storing means in said distinct time slot, second storing means for storing said generated signal, and apparatus operative in the time interval between successive occurring distinct time slots comprising means responsive to said stored generated signal for producing and applying a distinct signal to said first storing means, and means for applying the signal in said first storing means to said associated communication path.

6. A time division communication system according to claim 5 wherein said first means comprises a first operational amplifier having an input and an output, said first operational amplifier input being connected to said first common bus, said first operational amplifier output being connected to said magnitude controlling means, said second means comprises a second operational amplifier having an input and an output, said second operational amplifier input being connected to said third common bus, said third means comprises a third operational amplifier having an input and an output, said third operational amplifier input being connected to said magnitude controlling means and to said second operational amplifier output, said third operational amplifier output being connected to said second common bus, said fourth means comprising a fourth operational amplifier having an input and an output, said fourth operational amplifier input being connected to said first operational amplifier output and to said second operational amplifier output, and said fourth operational amplifier output being connected to said fourth common bus.

7. A time division communication system according to claim 6 wherein each of said first, second, third and fourth operational amplifiers comprises an operational amplifier having unity gain and said magnitude controlling means comprise an attenuator circuit for attenuating the magnitude of the sum of the outgoing first group communication path signals from said first operational output whereby the attenuated sum of the first group communication path outgoing path signals from said attenuator circuit has a predetermined relationship to the sum of the second group communication path outgoing signals from the output of said second operational amplifier.

* * * * *